United States Patent
Rayos

(10) Patent No.: US 9,032,593 B2
(45) Date of Patent: *May 19, 2015

(54) FASTENING OR MOUNTING APPARATUS

(71) Applicant: RayoMar Enterprises, Inc., Sterling Heights, MI (US)

(72) Inventor: Richard C. Rayos, Sterling Heights, MI (US)

(73) Assignee: RayoMar Enterprise, Inc., Sterling Heights, MI (US)

( * ) Notice: Subject to any disclaimer, the term of this patent is extended or adjusted under 35 U.S.C. 154(b) by 122 days.

This patent is subject to a terminal disclaimer.

(21) Appl. No.: 13/717,159

(22) Filed: Dec. 17, 2012

(65) Prior Publication Data

US 2013/0108360 A1    May 2, 2013

Related U.S. Application Data

(63) Continuation-in-part of application No. 12/783,258, filed on May 19, 2010, now Pat. No. 8,341,810.

(51) Int. Cl.
*F16B 17/00* (2006.01)
*B60R 9/048* (2006.01)
*F16B 5/06* (2006.01)

(52) U.S. Cl.
CPC .......... *F16B 17/00* (2013.01); *Y10T 403/7039* (2015.01); *B60R 9/048* (2013.01); *F16B 5/0635* (2013.01); *F16B 5/0664* (2013.01)

(58) Field of Classification Search
CPC .......... B60R 9/045; B60R 9/058; B60R 9/04; B60R 16/04; B60R 9/048; F16B 5/0692; F16B 5/10; F16B 5/0664; F16B 5/0635; E04H 15/646; A45C 13/126
USPC ........ 24/462, 460, 461, 573.09, 580.1, 581.1; 224/321, 326, 310, 315, 317, 322; 439/716, 532; 403/286, 121, 532, 363, 403/375, 322.4, 350; 52/460, 465, 60, 242, 52/405.2, 436, 470
See application file for complete search history.

(56) References Cited

U.S. PATENT DOCUMENTS

| | | |
|---|---|---|
| 3,165,163 A | 1/1965 | Holka |
| 3,325,067 A | 6/1967 | Helm |
| 4,099,658 A | 7/1978 | Bott |
| 4,411,401 A | 10/1983 | Anderson |
| 4,721,239 A | 1/1988 | Gibbs, III et al. |
| 5,042,553 A | 8/1991 | Schaffer et al. |
| 5,170,920 A | 12/1992 | Corrente et al. |

(Continued)

OTHER PUBLICATIONS

International Search Report dated Sep. 9, 2013; 4 pages.

*Primary Examiner* — Robert J Sandy
*Assistant Examiner* — Rowland Do
(74) *Attorney, Agent, or Firm* — Linda D. Kennedy; Bill C. Panagos; Butzel Long, PC

(57) ABSTRACT

A fastening or mounting apparatus for releasably joining two objects is disclosed. The apparatus uses a cam portion opposite a hook portion in a structure of one of the objects to engage with flanges, protrusions or ends of the other object. In the case of flanges, one of the flanges deforms a resilient element in the hook portion during insertion, and the other flange snaps into the detent of the cam portion upon application of force. The apparatus may be adaptable from small scale applications to large-scale heavy duty applications.

16 Claims, 11 Drawing Sheets

(56) References Cited

U.S. PATENT DOCUMENTS

| | | |
|---|---|---|
| 5,192,227 A | 3/1993 | Bales |
| 5,358,162 A | 10/1994 | Hill |
| 5,598,959 A | 2/1997 | Lorensen et al. |
| 5,602,363 A | 2/1997 | Von Arx |
| 5,664,715 A | 9/1997 | Gogan et al. |
| 5,904,592 A | 5/1999 | Baran et al. |
| 5,907,476 A | 5/1999 | Davidsz |
| 6,017,251 A | 1/2000 | Rittmann |
| 6,234,371 B1 | 5/2001 | Sinn |
| 6,431,909 B1 | 8/2002 | Nolden et al. |
| 6,456,495 B1 | 9/2002 | Wieloch et al. |
| 6,543,957 B1 * | 4/2003 | Raspotnig ............ 403/286 |
| 6,546,598 B1 | 4/2003 | Nakanou et al. |
| 7,090,103 B2 | 8/2006 | Aftanas et al. |
| 2005/0274757 A1 | 12/2005 | Arend |
| 2007/0049095 A1 | 3/2007 | Kikuchi |
| 2009/0044997 A1 | 2/2009 | Picavet |
| 2010/0216334 A1 * | 8/2010 | Christmann et al. ........ 439/532 |

* cited by examiner

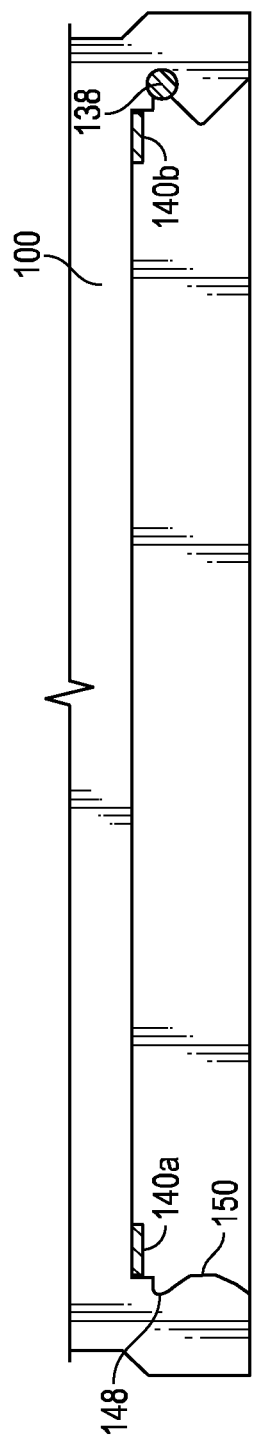
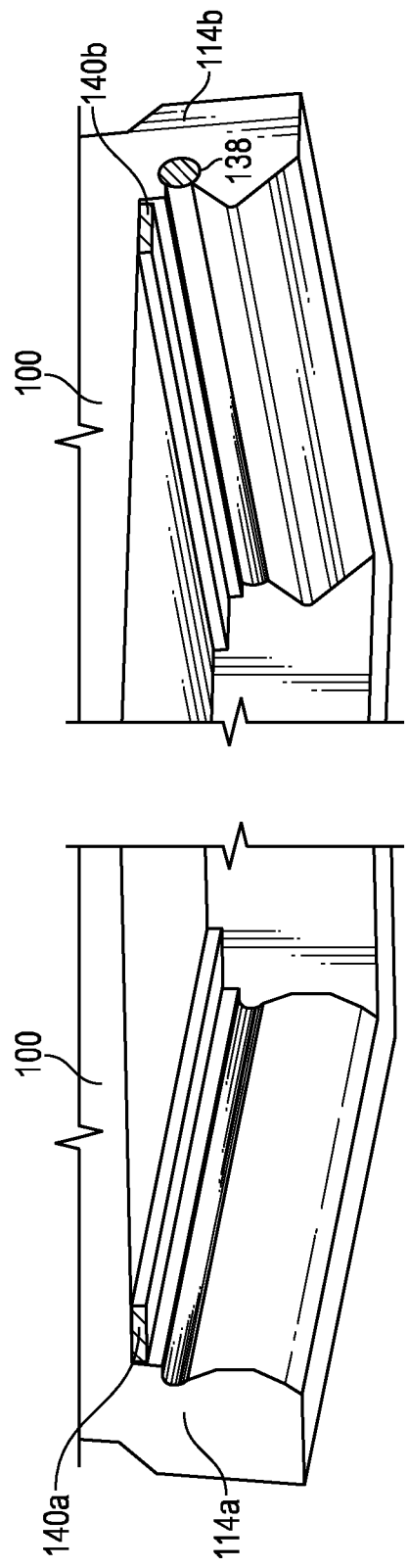
FIG. 11
FIG. 12
FIG. 13

FASTENING OR MOUNTING APPARATUS

CROSS-REFERENCE TO RELATED APPLICATIONS

This application is a continuation-in-part of U.S. Utility patent application Ser. No. 12/783,258 filed on May 19, 2010, which claims the benefit of U.S. Provisional Application No. 61/248,561 filed on Oct. 5, 2009, both of which are hereby incorporated by reference in their entireties.

BACKGROUND

Fastening and mounting apparatuses are needed for a variety of applications, from small-scale securements to large-scale heavy duty securements. It may be desirable in some instances to have a fastening apparatus concept that can be scaled up or scaled down depending upon the application.

Traditionally, large-scale heavy duty fastening and mounting apparatuses required multiple reinforcement parts, such as a series of nuts and bolts, to achieve an adequate level of securement. Such additional reinforcement parts may add weight and complexity to the fastening and mounting apparatuses. In some instances, such fastening and mounting apparatuses have complex geometries and may require special tools to fasten and to release. Such fastening and mounting apparatuses can be cumbersome to use, taking time and intellectual effort to fasten and to release. It may be desirable in some instances to have a fastening or mounting apparatus concept that minimizes the number of parts and simplifies use, while providing sufficient securement for the application.

Certain existing snap-type fastening or mounting apparatuses that eliminate additional reinforcement parts such as nuts and bolts may not provide adequate securement against undesired movement in all directions. For example, some snap-type fasteners do not protect against lateral sliding in the absence of additional locking members. Certain existing fastening or mounting apparatuses may not provide adequate securement in all directions in heavy duty applications where outside forces acting on the apparatus may be significant. Non-limiting examples of such outside forces in heavy duty applications include explosive forces acting on fastening or mounting apparatuses on or in walls of military vehicles through nearby explosions, or natural wind and weather-related forces acting on fastening or mounting apparatuses on or in outdoor systems, such as fastening or mounting apparatuses releasably securing solar panels in a solar farm.

SUMMARY

The exemplary fastening and mounting apparatuses and methods described herein may address one or more of the challenges left open by existing fastening and mounting apparatuses and systems.

BRIEF DESCRIPTION OF THE DRAWINGS

Features and advantages may become more apparent from the following detailed description of exemplary embodiments taken in conjunction with the accompanying drawings, described in brief below.

FIG. 11 is a cutaway view of an exemplary battery housing.

FIG. 12 is a perspective view of an exemplary fastening cam end integrated into a housing of an item such as a battery housing.

FIG. 13 is a perspective view of an exemplary fastening hook end integrated into a housing of an item such as a battery housing.

DETAILED DESCRIPTION

Exemplary, non-limiting embodiments of fastening or mounting apparatuses 10 and associated methods are disclosed herein. When a series of nested ranges regarding physical properties, dimensions and the like are described with reference to a particular exemplary embodiment, it is contemplated that any disclosed minimum in one of the nested ranges may be used in connection with any of the disclosed maximums in the series of nested ranges.

Figure 1:
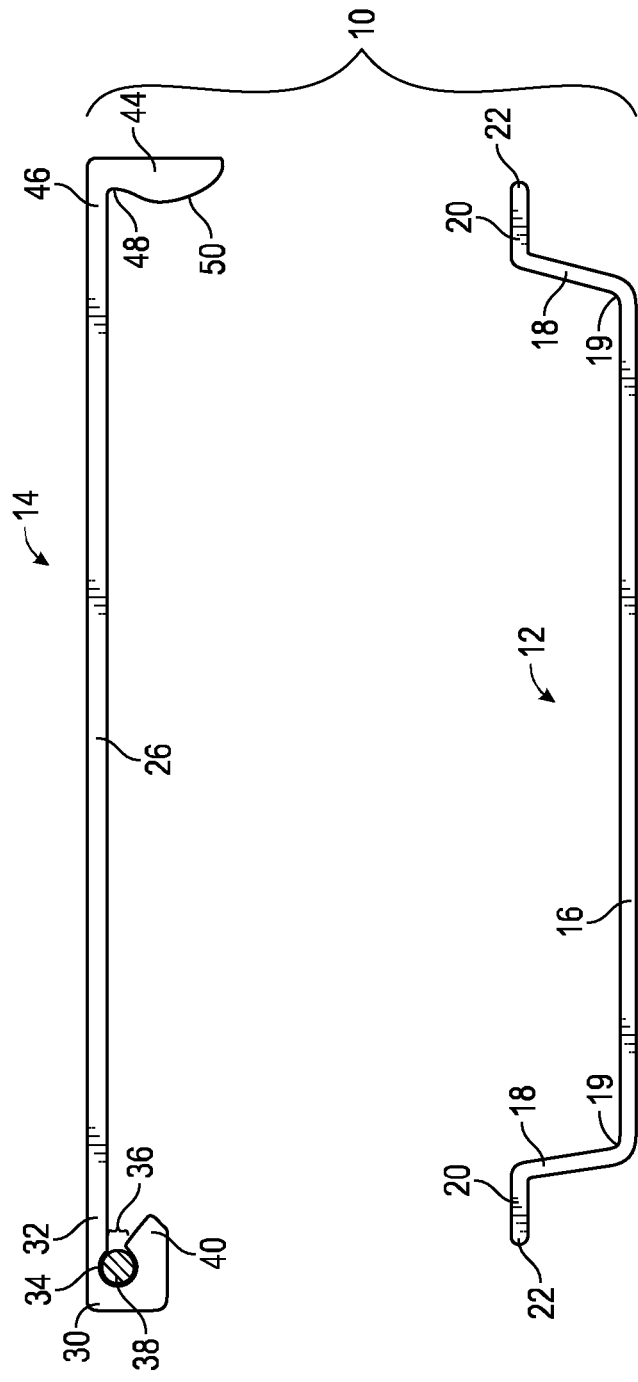
FIG. 1 is an exploded end view or cross-sectional view of an embodiment of the fastening or mounting apparatus.

FIG. 1 shows an exploded, cross-sectional or end view of an embodiment of the fastening or mounting apparatus 10. The apparatus 10 comprises a first component 12, an alternative embodiment of which is shown in a perspective view in FIG. 3, and a second component 14, an alternative embodiment of which is shown in a perspective view in FIG. 2. It should be noted that the first component 12 may be built into or added onto a structure or platform onto or into which items are desired to be fastened. It should also be noted that the second component 14 may be built into or added onto items where there is a need to releasably secure that item to a structure or a platform.

Figure 3:
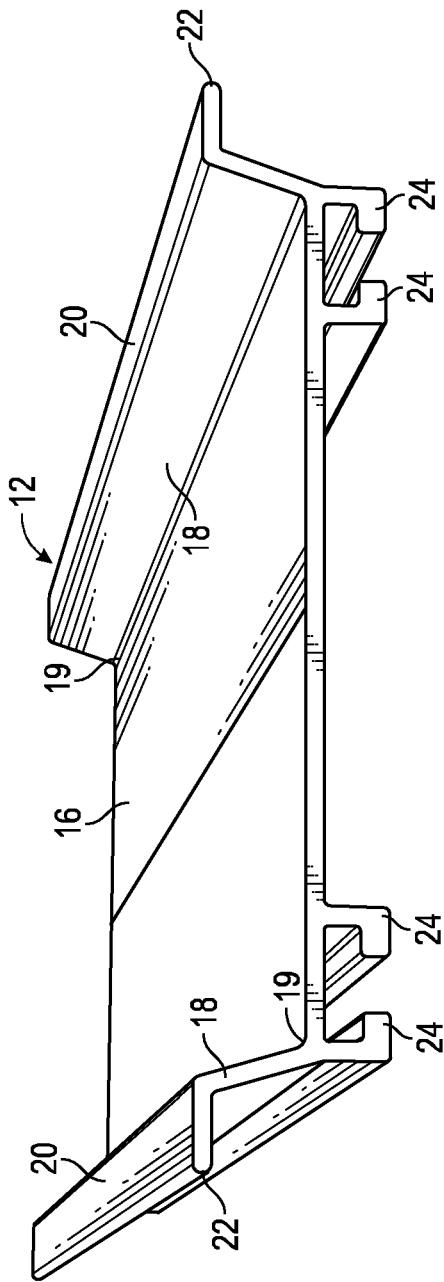
FIG. 3 is a perspective view of a component of the fastening or mounting apparatus.

With reference to FIGS. 1 and 3, the first component 12 of the apparatus 10 comprises a substantially rectangular and substantially planar plate 16. Other shapes and forms of plate 16 are contemplated. For example, in embodiments where the first component 12 is built onto or into a structure or a platform to which items are to be fastened, plate 16 may be replaced with a portion of the structure or the platform intermediate flanges 20.

With reference to the exemplary embodiments of FIGS. 1 and 3, the plate 16 may be a single, solid piece of material or may be otherwise foamed with holes or spaces (not shown) throughout the plate to save material and weight. The first component 12 further comprises side walls 18 formed with or joined to the plate 16 along longitudinal edges 19. Each side wall 18 may form an angle with respect to the plate 16, which angle may vary in different embodiments. In some embodiments, the angle between the plane substantially formed by each side wall 18 and the plane formed by the plate 16 may be in a range of approximately 80 to 180 degrees. Each side wall 18 has a flange 20 formed with or joined to it. In some embodiments, each flange 20 may be substantially planar and lie in a plane substantially parallel to the plane in which plate 16 lies. In some embodiments, one or both of the flanges 20 further comprises a tip 22 having a substantially semicircular cross-sectional shape or other geometry.

Figure 6:
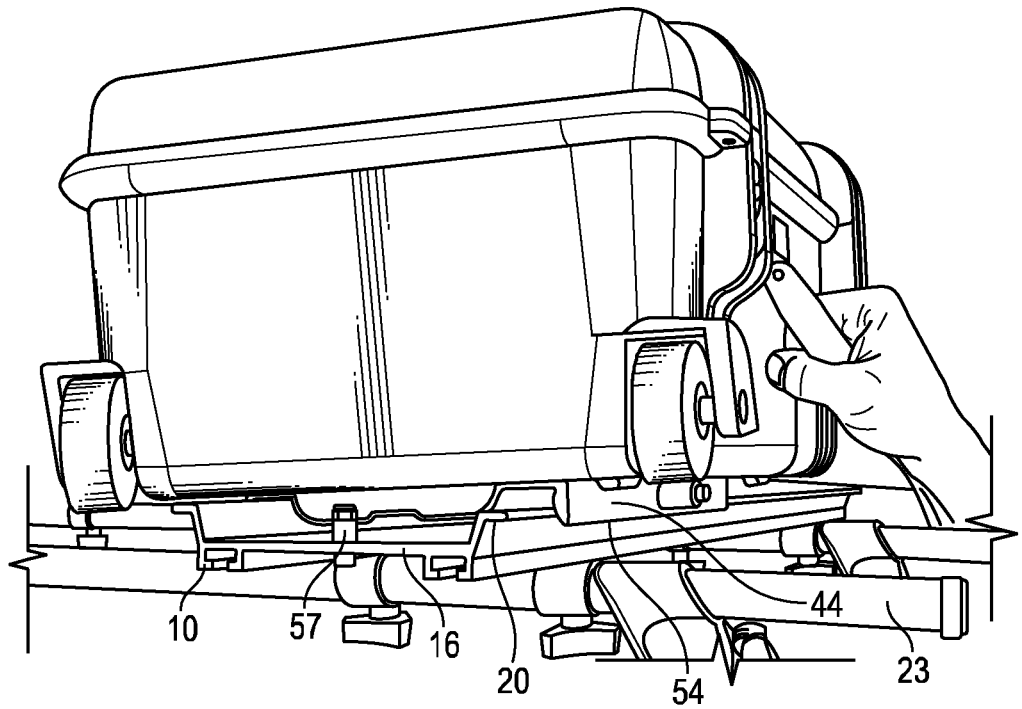
FIG. 6 is a perspective view of the fastening or mounting apparatus in operation.
Figure 7:
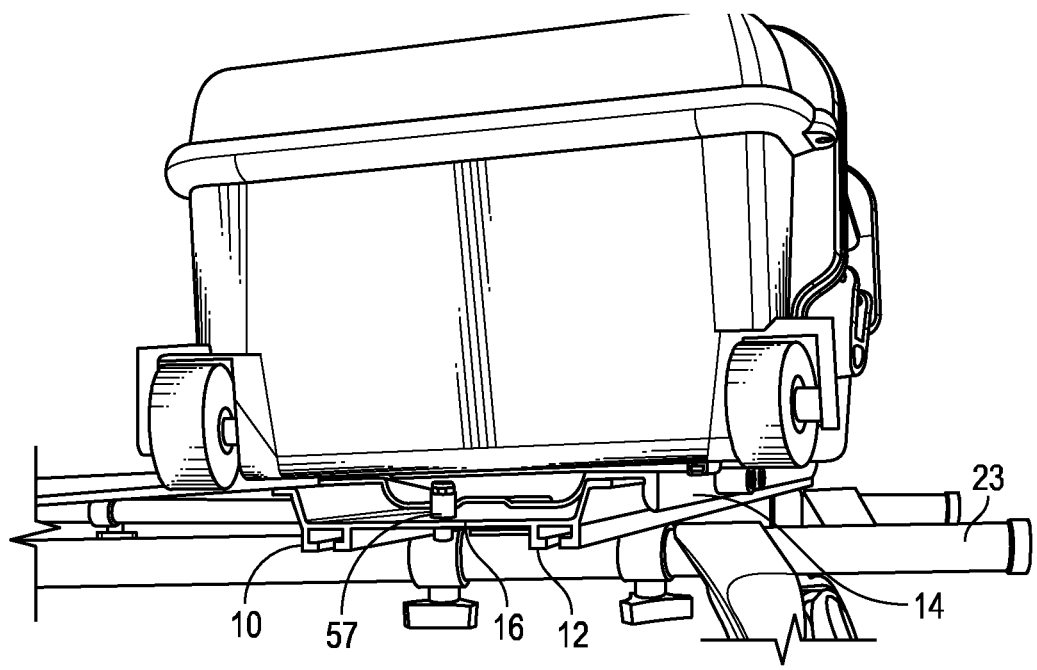
FIG. 7 is another perspective view of the fastening or mounting apparatus in operation.
Figure 8:
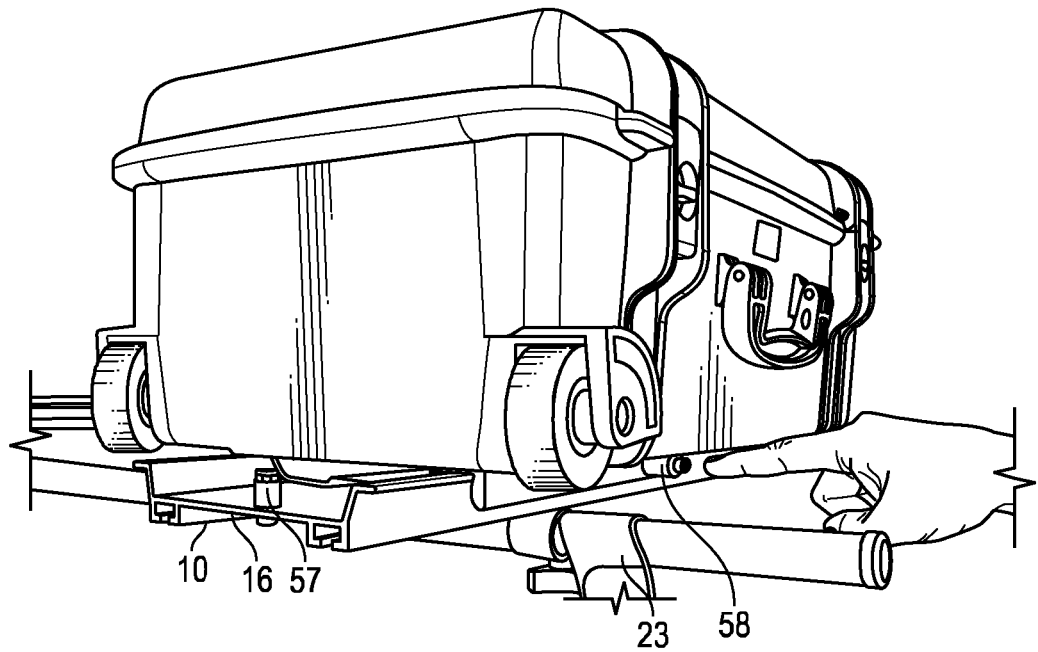
FIG. 8 is another perspective view of the fastening or mounting apparatus in operation.

The first component 12 of the apparatus 10 may be mounted on a fixed surface (not shown), on a vehicle (not shown), or attached to or integrally formed with any number of items or objects. By way of example and not limitation, the first component 12 may be mounted to a rooftop rack 23 of a vehicle, such as a rack on an automobile, as shown in FIGS. 6-8. Holes (not shown) may be provided in the first component 12 to facilitate mounting of the first component, or in an alternative embodiment, the first component 12 may include rails 24 for mounting the first component 12 on a fixed surface or on a vehicle.

Figure 2:
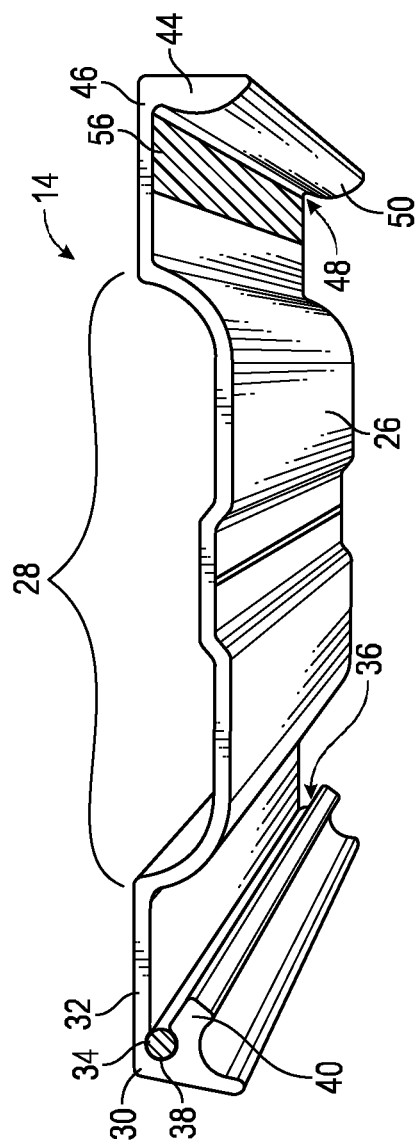
FIG. 2 is a perspective view of a component of the fastening or mounting apparatus.
Figure 4:
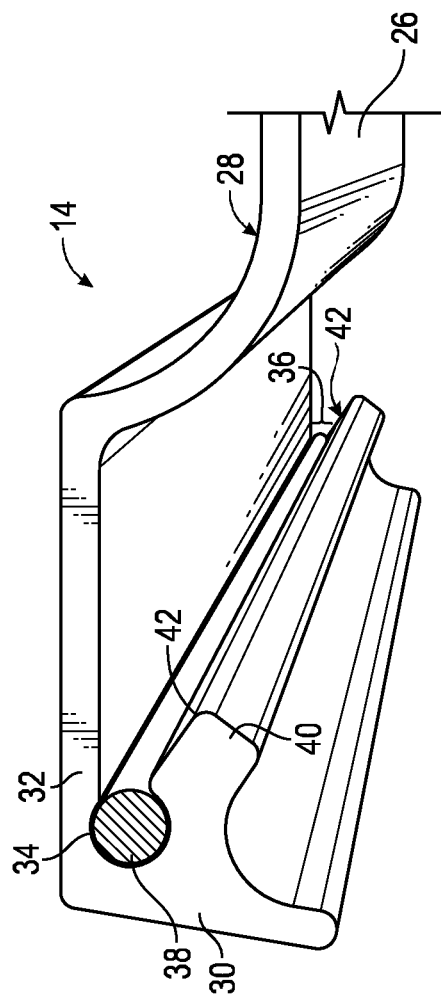
FIG. 4 is an enlarged perspective view of a portion of a component of the fastening or mounting apparatus.

With reference to FIGS. 1, 2, and 4, the second component 14 of the apparatus 10 comprises a substantially rectangular plate 26. Other shapes and forms of plate 26 are contemplated. For example, in embodiments where the second component 14 is built onto or into an item to be releasably secured to a structure or a platform, plate 26 may be replaced with a portion of the item intermediate opposing structure for releasable securement to another object such as lips 30 and 44.

With reference to the exemplary embodiments of FIGS. 1, 2 and 4, the plate 26 may be substantially planar as shown in the embodiment illustrated in FIG. 1, or the plate 26 may have a recessed portion 28 as shown in the embodiment illustrated in FIG. 2. The plate 26 may be a single, solid piece of material or may be otherwise formed with holes or spaces (not shown) throughout the plate to save material and weight.

The second component 14 further comprises a first lip 30 formed with or joined to the plate 26 along longitudinal edge 32 of the plate 26. The first lip 30, either alone or in combination with the plate 26 and the longitudinal edge 32 of the plate 26, further defines a cavity 34 having an aperture 36. In some embodiments, the cavity 34 may have a substantially semi-circular cross-sectional shape as disclosed in FIGS. 1, 2, and 4. In other embodiments, the cavity 34 may have a different cross-sectional shape. The aperture 36 is sized to receive a flange 20 of the first component 12. In some embodiments, a resilient element 38 is disposed within the channel 34. The resilient element 38 may be any resilient material, including but not limited to any of various polymers or natural or synthetic rubbers including silicone rubber. Further, the resilient element 38 may be disposed throughout the entire length of the channel 34 or may comprise multiple portions (not shown) disposed intermittently or at intervals throughout the channel 34. In some embodiments, the first lip 30 may further comprise a projection 40 having a beveled surface 42, both of which may run the entire length of the first lip 30 or may comprise multiple portions or segments (not shown).

With reference to FIGS. 1 and 2, the second component 14 further comprises a second lip 44 formed with or joined to the plate 26 along longitudinal edge 46. The second lip 44, either alone or in combination with the plate 26 and the longitudinal edge 46 of the plate 26, defines a detent 48 and a convex portion 50. The detent 48 is sized to receive the tip 22 of one of the flanges 20. In some embodiments, the detent 48 may have a rounded shape, such as a substantially semicircular shape sized to mate with the shape of the tip 22 of one or both of the flanges 20 in order to maximize the surface area in contact between the tip 22 and the detent 48 when the first component 12 and second component 14 are joined. Alternatively, the detent 48 and tips 22 of the flanges 20 may have other shapes suitable for maximizing the frictional forces between them when they are in contact with each other, such as complimentarily shaped geometries that maximize the amount of surface area over which the detent 48 and tip 22 make contact.

The first component 12 and second component 14, and any portion thereof, may be formed or manufactured from any substantially rigid material, including, but not limited to, one or more of wood, metal, plastic, or other substantially rigid material. The level of rigidity may depend upon the scale of the fastening or mounting apparatus 10. By way of example, for a small-scale fastening or mounting apparatus 10, an exemplary material may include a thermoplastic material with or without reinforcement from additives such as glass fibers. For larger-scale heavy duty fastening or mounting apparatuses, an exemplary material may include a thermosetting plastic with or without reinforcement from additives or a metal material. In one exemplary embodiment, first and second components 12 and 14 are made from extruded, anodized aluminum. In another exemplary embodiment, first component 12 is made from formed sheet metal having a thickness in the range of approximately 10 to 16 gauge. In other embodiments, first and second components 12 and 14 may be made from other metals, including but not limited to magnesium, steel, or stainless steel. In some military applications, components 12 and 14 may be formed using ultra high hardness steel to manage. In embodiments constructed or formed from metal, the metal may be anodized. In some embodiments, it may be desirable to form, sand, machine, or otherwise make all exposed edges of both first and second components 12 and 14 dull or rounded in order to prevent injuries to users when handling or using the apparatus 10. By way of example and not limitation, in an embodiment wherein the first component 12 is made from sheet metal, tips 22 of flanges 20 may comprise a folded hem.

Further, components 12 and 14, and any portion thereof, may be manufactured through any of a variety of processes, either separately from or together with objects to be releasably fastened or mounted to each other. Exemplary non-limiting manufacturing methods may include injection molding, stamping, roll-forming, investment casting or extruding. As noted above, components 12 and 14 can be integrated into or onto items or platforms such that intermediate plates 16 and/or 26 may not be necessary and may be replaced with structure from the item or platform integral with the component 12 or 14. In this manner, the component 12 or 14 may be manufactured or assembled as a part of the manufacture or assembly of an item to be releasably secured or as a part of the manufacture or assembly of a platform or structure to which an item is to be releasably secured. By way of example, if component 12 is made with the item, then component 14 may be made with the platform. In other embodiments, if component 14 is made with the item, component 12 may be made with the platform. An item, for example, may be any number of items suitable for secure releasable fastening. Such items may include storage devices, backpacks, a seating structure, automotive batteries, and other items. A platform may be any number of structures where secure releasable fastening is desired. Such platforms may include, for example, a surface or receptacle in a military vehicle, such as a wall in a helicopter, an under-the-hood component of a military or civilian vehicle, or an outdoor structure such as a structure for supporting a solar panel.

In operation, the first component 12 may be fastened or attached to or integral with a fixed surface such as the surface of a vehicle. By way of example and not limitation, the first component 12 may be mounted to a rooftop rack 23 of a vehicle, such as a rack on an automobile as shown in FIGS. 6-8. The second component 14 may be separately fastened or attached to or integral with another surface or object, such as, by way of example and not limitation, a trunk, suitcase, or other object. Holes 52 may be provided in the plate 26 of the second component 14 for fastening or attaching the second component 14 to the surface or object. In embodiments where the second component 14 is intended to be attached to cargo or luggage having a handle, external frame, or other external protrusion, embodiments of the second component 14 having a recessed portion 28 of the plate 26 to accommodate such external features may be used.

Figure 5:
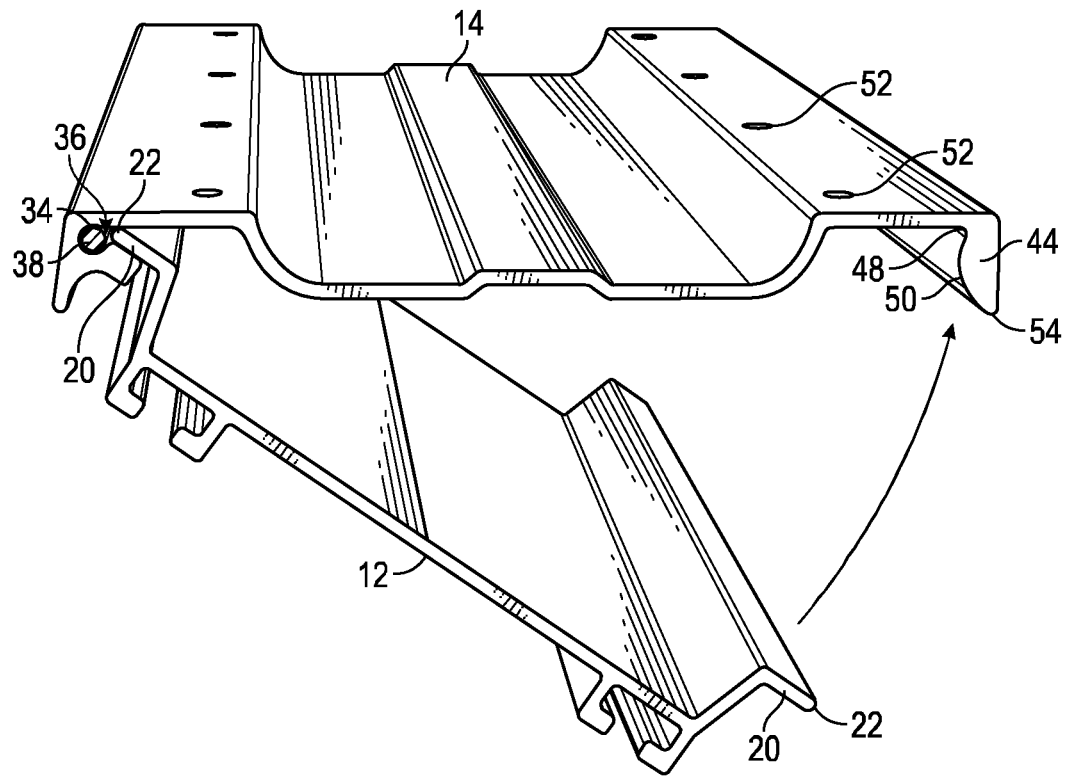
FIG. 5 is a perspective view of components of the fastening or mounting apparatus.

With reference to FIG. 5, first and second components 12 and 14 are joined or connected together by first inserting one flange 20 into the aperture 36 of cavity 34 at an angle sufficient for the other flange 20 not to interfere with the second lip 44. The flange 20 inserted into cavity 34 should contact the resilient element 38. The first and second components 12 and 14 are then rotated relative to each other around the points of contact between the flange 20 and the resilient element 38 so that the other flange 20 approaches the leading edge 54 of the second lip 44, as shown in FIG. 6. The first and second components 12 and 14 should be sized so that when these components come into contact in this way, sliding the rounded tip 22 of flange 20 along the convex portion 50 of the second lip 44 causes the opposite flange 20 to compress the resilient element 38 inside of the cavity 34. As the tip 22 of the flange 20 in contact with the convex portion 50 of the second lip 44 slips over the tangent point of the convex portion 50 of the second lip 44, a restoring force from the compressed resilient element 38 acting on the first component 12 will aid the tip 22 of the flange 20 in seating itself in the detent 48. Once the tip 22 has come to rest in the detent 48, the resilient element 38 may be in a slightly compressed condition such that the resilient element 38 is exerting a force on the first component 12 sufficient to maintain contact between the rounded tip 22 of the flange 20 and the detent 48. Further, the convex portion 50 creates an additional interference fit of the tip 22 of the flange 20 in the detent 48.

Once joined or connected together, the force exerted by the resilient element 38 on the first component and the geometry of the detent 48 and convex portion 50 of the second lip 44 should be sufficient to prevent the first and second components 12 and 14 from decoupling absent the application of specific forces or couples that are sufficient to both compress the resilient element 38 and rotate the first and second components 12 and 14 relative to each other such that the tip 22 of the flange 20 in the detent will ride over the convex portion 50 of the second lip 44 toward the leading edge 54 of the convex portion 50, thus allowing the opposite flange 20 to be removed from the cavity 34. The amount of force required for releasing or decoupling may depend upon several variables, including, without limitation, (1) the distance between the tips 22 of the flanges 20 of the first component, (2) the distance between the detent 48 and the resilient element 38, (3) the geometry of the convex portion 50 of the second lip 44, and (4) the size, composition, and durometer of the resilient element 38. In some embodiments, the first and second components 12 and 14 are sized so that the tip 22 of one flange 20 is in substantially uniform contact with the resilient element 38 along the entire length of the apparatus 10 while the tip 22 of the other flange 20 is in substantially uniform contact with the detent 48 along the entire length of the apparatus 10 when the first and second components 12 and 14 are joined.

In some embodiments, depending upon the other variables discussed above, the distance from the tip 22 of one flange 20 to the tip 22 of the other flange 20 is approximately equal to the distance measured from the center of the cavity 34 to the inside tangent point of the convex portion 50 of the second lip 44. Alternatively, the tip-to-tip distance between the flanges 20 may be such that the resilient element 38 is slightly compressed such that it exerts a force on the first component 12 sufficient to maintain contact between the tip 22 of the flange 20 and the detent 48 when the tip 22 of one flange 20 is at rest in the detent 48. This force may be different in different embodiments depending upon the composition and hardness of the resilient element 38 as more fully described below.

In some embodiments, the resilient element 38 is a polymer strip, cord, or rod made from any polymer such as, by way of example and not limitation, polyurethane. In other embodiments, the resilient element 38 may be made from natural or synthetic rubber. In some embodiments, the resilient element 38 may be made from materials naturally resistant to or treated to be resistant to degradation caused by exposure to the elements, including but not limited to ultraviolet radiation, air, water, snow, ice, and extreme temperatures. The durometer of the resilient element 38 may be different in different embodiments depending in some embodiments upon the desired holding or frictional forces needed for the particular mounting application. Durometer, as used herein, measures the hardness of material as determined by its resistance to permanent indentations. Durometer may be measured according to ASTM standard D2240. Many of the materials contemplated herein (for example, soft rubbers, plastics and elastomers) are measured on a Type A durometer scale, where others may be measured on a Type D scale according to the standard. The durometer values stated herein are with reference to a Type A scale.

In other embodiments, the durometer of the resilient element 38 may depend upon the desired ease or difficulty of joining and decoupling the first and second components 12 and 14. In general, the greater the durometer of the resilient element 38, the greater the force necessary to join or decouple the first and second components 12 and 14, but also the greater the frictional or holding forces keeping the first and second components 12 and 14 together when coupled. Thus, heavier duty applications may seek a resilient element 38 with a relatively higher durometer. Depending upon the application for which the apparatus 10 is intended, the resilient element 38 may have a durometer in a range from approximately 20 to 90, although there may be applications in which a durometer lower than 20 or higher than 90 may be used. In one exemplary embodiment, the resilient element 38 comprises silicone rubber and has a durometer in a range from approximately 40 to 55.

In some embodiments, a resilient strip 56 may be attached to the underside of plate 26 of the second component 14. In such embodiments, when the first and second components 12 and 14 are joined, the flange 20 nearest the detent 48 will be in contact with or even slightly compress the strip 56, increasing the frictional forces holding the first and second components together. This feature may be desirable in embodiments in which a lower durometer resilient element 38 is used in order to increase the relative ease of joining and decoupling the first and second components 12 and 14 while also maintaining holding forces sufficient to withstand the forces encountered in use. The strip 56 inhibits sliding of the components 12 and 14 relative to each other along the tips 22 of the flanges 20. The strip 56 may be made from any resilient material. In one exemplary embodiment, the strip 56 comprises silicone rubber.

During securing and/or releasing first and second components 12 and 14 with respect to one another, additional structure may be desired to minimize or prevent lateral sliding between the components 12 and 14. With reference to FIGS. 6, 7, and 8, some embodiments of the apparatus 10 may further comprise a stop 57 attached to the first component 12 to further prevent the decoupling of the first and second components 12 and 14 that might occur through a relative sliding motion between the components. In these embodiments, the stop is attached to the plate 16 of the first component 12 and projects in a direction substantially normal to the plane of the plate 16 sufficiently in order to interfere with the plate 26 of the second component 14. In embodiments where the second component 14 may slide relative to the first component 12, the stop 57 interferes with the motion of the second component 14 in order to prevent decoupling of the first and second components 12 and 14 through relative sliding.

With reference to FIG. 7, once joined or connected as described above, the first and second components 12 and 14 are substantially resistant to separation under a wide variety of static and dynamic loads. In particular, in some embodiments, once joined, the first and second components 12 and 14 do not laterally slide with respect to one another. In this configuration, the force exerted by the resilient element 38 on the first component and the geometry of the detent 48 and convex portion 50 of the second lip 44 is sufficient to prevent the first and second components 12 and 14 from decoupling absent the application of specific forces or couples that are sufficient to both compress the resilient element 38 and rotate the first and second components 12 and 14 relative to each other such that the tip 22 of the flange 20 in the detent will ride over the convex portion 50 of the second lip 44 toward the leading edge 54 of the convex portion 50, thus allowing the opposite flange 20 to be removed from the cavity 34. Further, in some embodiments, when coupled, sufficient compressive and frictional forces exist between the first and second components 12 and 14 such that the components are substantially resistant to any relative motion under static and dynamic loading conditions, admitting of no or substantially no sliding, lateral motion, or decoupling.

In some instances, one or both of first and second components 12 and 14 may become bent or deformed through accident or use such that the relative dimensions between the tips 22 of the flanges 20 of the first component 12 no longer provide a secure fit between the resilient element 38 and detent 48 of the second component 14. In such instances, the projection 40 and beveled surface 42 of some embodiments provide an alternative mechanism for inhibiting the separation or decoupling of the first and second components 12 and 14. Specifically, in such instances, in the presence of forces or force components acting substantially normal to the plane substantially defined by either of plates 16 or 26, the flange 20 may contact the beveled surface 42 of the projection 40. In these embodiments, the beveled surface 42 is angled relative to the plane substantially defined by either of plates 16 or 26 so that any reaction force occurring from any contact between the flange 20 and the beveled surface 42 generally acts to maintain contact between the opposite flange 20 and the detent 48. In one exemplary embodiment, the beveled surface 42 substantially resides in a plane that forms an angle of approximately 35 degrees with respect to the plane substantially defined by either of plates 16 or 26, however other angles may be used.

Figure 9:
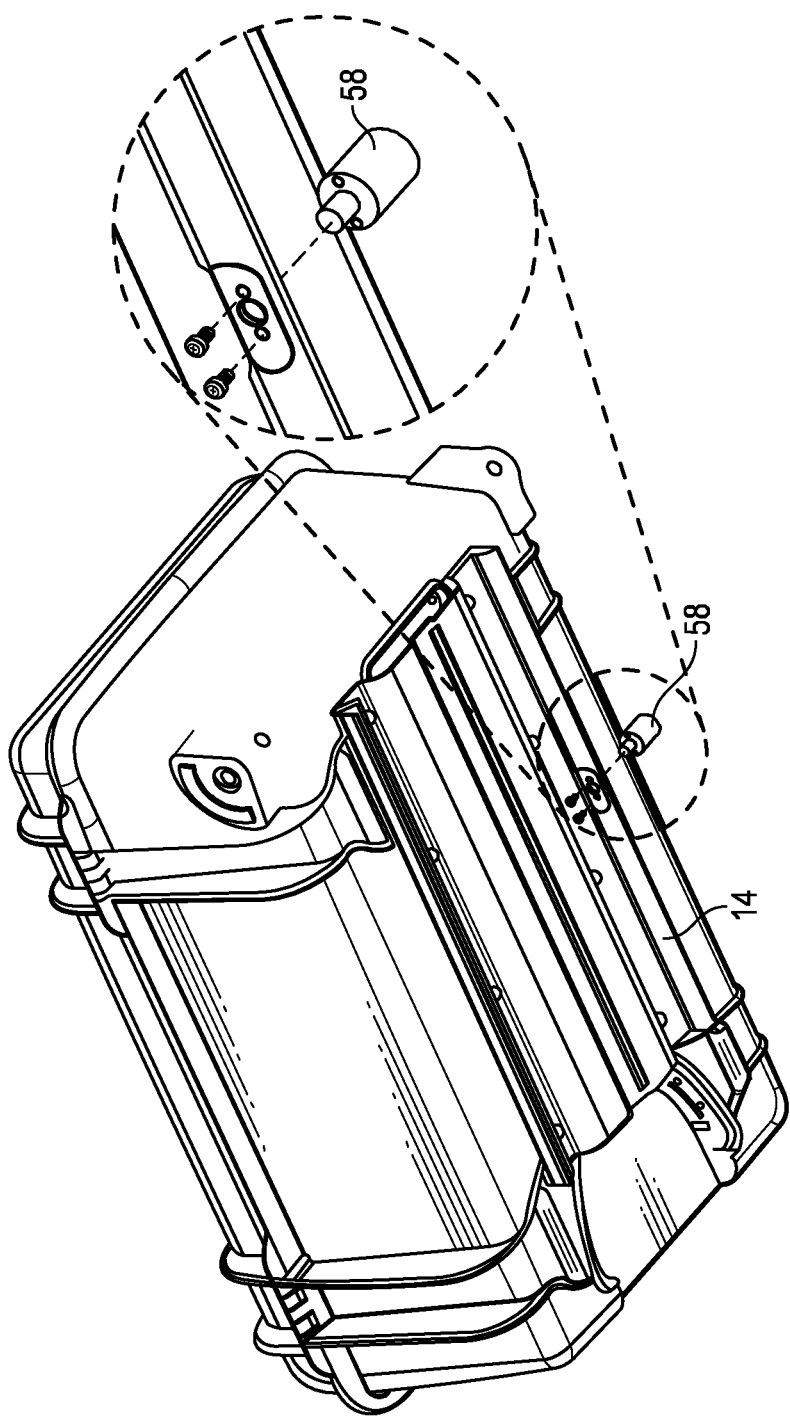
FIG. 9 is a perspective view of a component of the fastening or mounting apparatus showing in inset an enlarged detail.

In some embodiments of the apparatus 10, as shown for instance in FIGS. 8 and 9, a lock 58 may be used to temporarily secure the coupling of first and second components 12 and 14. The lock 58 may serve as a security lock, to prevent theft and the like. With respect to any anti-sliding or anti-decoupling function, the lock 58 may incidentally be helpful, if at all, but the lock 58 is not required for the anti-sliding and anti-decoupling function gained from the opposing interaction of opposite ends of the second component 14 when secured with flanges 20.

Figure 10:
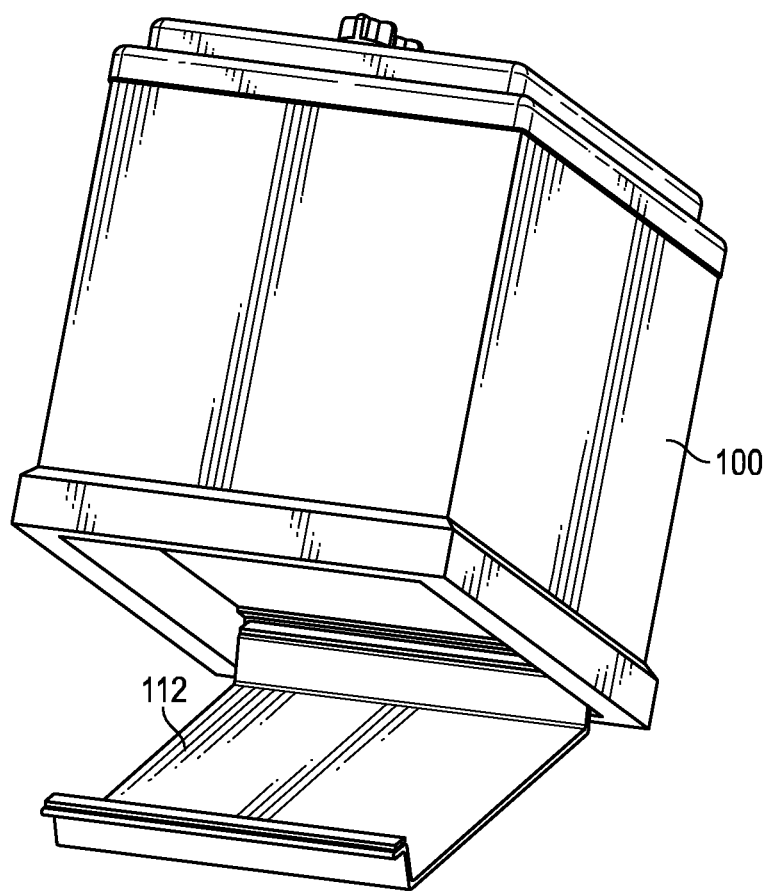
FIG. 10 is a perspective view of a battery used with an exemplary fastening or mounting apparatus.

Referring to FIGS. 10-16, an exemplary battery housing 100 is shown to illustrate how the disclosed fastening or mounting apparatus may be integrated into or onto a structure of an item or object. The term "battery housing" is not limited to a particular structure. It may refer to any outer surface of a battery, such as a battery case or carrier, or it may simply be the outer surface of the battery itself. In the example of FIG. 10, some or all of plate 112 is affixed to or integrated into an under-the-hood component of a vehicle. The term "plate" is not limited to a particular structure or shape. Plate 112 may refer to a battery tray, a platform in a vehicle for receiving a battery, etc. Plate 112 need not be substantially rectangular. The features of plate 112 are such that it is releasably engageable with battery housing 100. The disclosed fastening or mounting apparatus may be suitable for use in connections such as a battery connection where surface area contact between electrical connections is expected to be constant, substantially constant or otherwise sufficiently reliable.

Referring to FIGS. 11-13, exemplary battery housing 100 has electrical connectors 140a and 140b. Electrical connectors 140a and 140b can be sized, shaped, and formed from materials to meet conventional demands and/or developing demands for electric automobiles having lithium ion and other batteries with different properties and structures from conventional lead acid batteries. For example, although the electrical connectors 140a and 140b are shown as strips and protrusions, it is contemplated that the electrical connectors 140a and 140b could be recessed or flush with the surface of the battery housing 100, depending upon the nature and shape of the physical connection with the item or object required to complete the circuit. The shapes of 140a and 140b can also be modified to increase or decrease surface area depending upon the nature of the electrical connection. The exemplary battery housing 100 also includes a fastening system involving a cam portion 114a and an opposing hook portion 114b. The cam portion 114a is similar to the structure of the second lip 44 including a detent 48 and a convex portion 50 of FIG. 1. The cam portion 114a has a detent 148 and a convex portion 150. Battery housing 100 includes a hook portion 114b, where resilient element 138 resides in a recess, cavity or channel in battery housing 100. Hook portion 114b is similar to the first lip 30 of FIG. 1 with cavity 34 having resilient element 38 therein.

Figure 14:
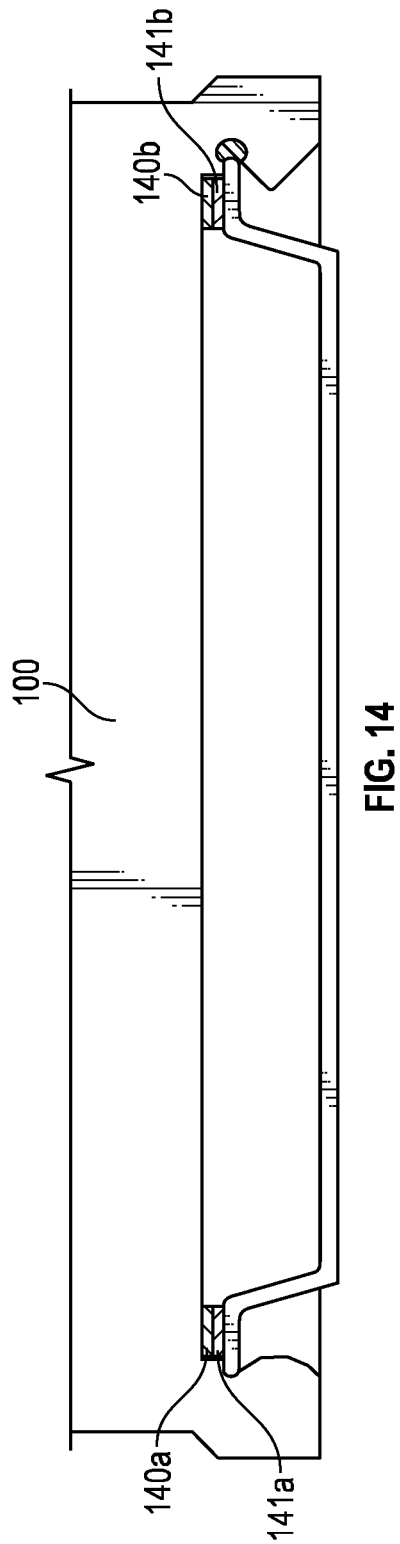
FIG. 14 is a cutaway view of an exemplary battery housing.
Figure 16:
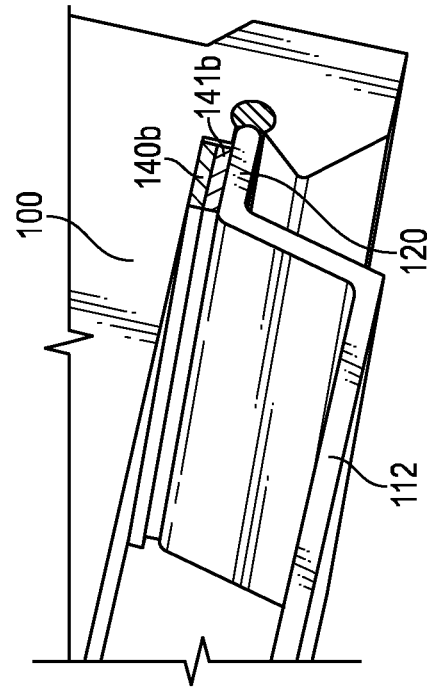
FIG. 16 is a perspective view of an exemplary fastening hook end integrated into a housing of an item such as a battery housing.
Figure 15:
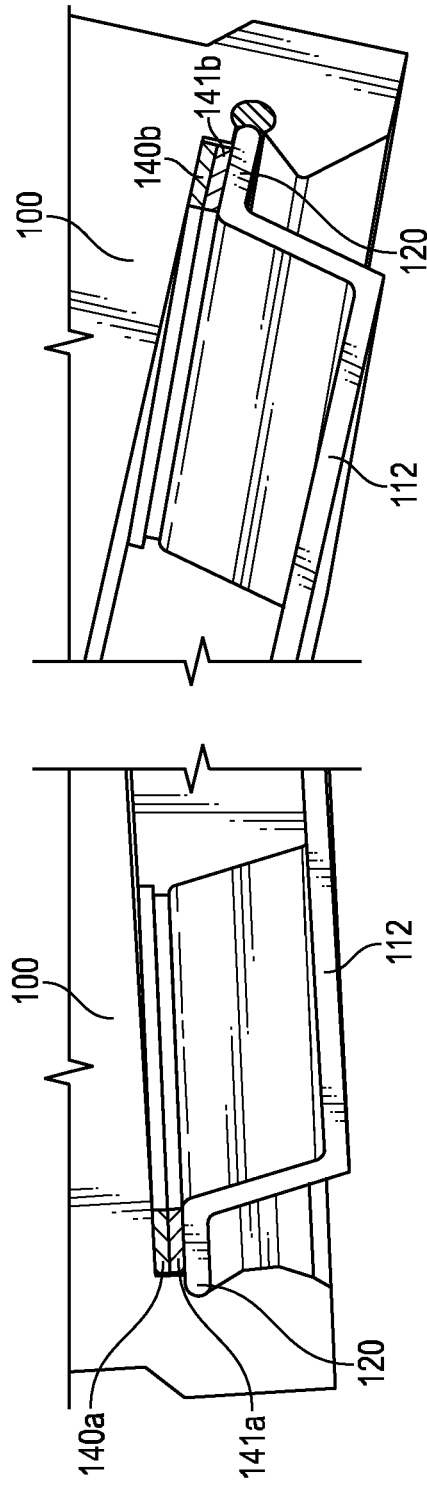
FIG. 15 is a perspective view of an exemplary fastening cam end integrated into a housing of an item such as a battery housing.

Referring to FIGS. 14-16, exemplary battery housing 100 is shown as it may interact with plate 112. In the disclosed embodiment, plate 112 has its electrical connectors 141a and 141b, which are sized and shaped to engage in electrical connection with electrical connectors 140a and 140b. The electrical connectors 141a and 141b are depicted as separate strips on plate 112, but other configurations are contemplated. By way of non-limiting example, a thickness of flange 120 could have a strip of conductive material therein, surrounded at least in part by insulative material as necessary for the function of the battery. Additionally, the contact area between 140a, 140b with 141a and 141b could be increased by adding dimples to one and bumps to the other. Such electrical connection between battery housing 100 and plate 112 may be protected from corrosion by minimizing or eliminating exposure to electrolyte and/or outside elements. As shown in FIG. 16, flange 120 interacts and compresses resilient element 138, allowing opposing flange 120 to snap into a detent to secure the battery housing 100 in place when force is applied.

In this exemplary configuration, the battery housing 100 is releasably attachable to the plate 112 through two steps: (1) inserting a first flange 120 of plate 112 into an opening in the hook portion 114b associated with the battery housing 100, thereby compressing the resilient member 138 residing in a cavity in the hook portion 114b accessible via the opening; then (2) snapping the second flange 120 of the plate 112 into a detent 148 of the cam portion 114a associated with the battery housing 100, the detent 148 being aligned with and opposite the opening in the hook portion 114b.

Alternative arrangements of a battery fastening system are similarly contemplated, where the battery housing 100 has flanges 120, and the plate 112 has the fastening component with the cam portion 114a and the hook portion 114b. In such an embodiment, a battery housing 100 may have a first flange 120 and a second flange 120 insertable into a plate 112 such as a battery tray or platform. The plate 112 has a hook portion 114b with a lip at least partially defining a cavity with a resilient element 138 therein. The resilient element 138 is partially exposed through an opening in the cavity. In such an embodiment, the plate 112 also has a cam portion 114a opposite the hook portion 114b, the cam portion has a detent 148 and a convex portion 150. In such an embodiment, the hook portion 114b and the cam portion 114a are aligned so that the detent 148 is opposite the opening so that the battery is releasably fastenable to the plate 112 by inserting the first flange 120 of the battery housing 100 into the opening by compressing the resilient element 138, and then snapping a second flange 120 into the detent 148.

In exemplary embodiments where a battery fastening system may be used under vacuum conditions such as in satellite or certain aerospace applications, it may be desirable to address the phenomenon of cold welding. Under vacuum conditions, the metallic connections between the battery housing 100 and the plate 112 may undergo a cold welding process where the absence of modifications or additives could lead to a fusing of the parts together. This may be addressed by several different approaches, including using soft materials such as aluminums in the electrical connection, or using certain electrically conductive lubricants, greases or coatings, including solid lubricants such as molybdenum disulfide.

Figure 17:
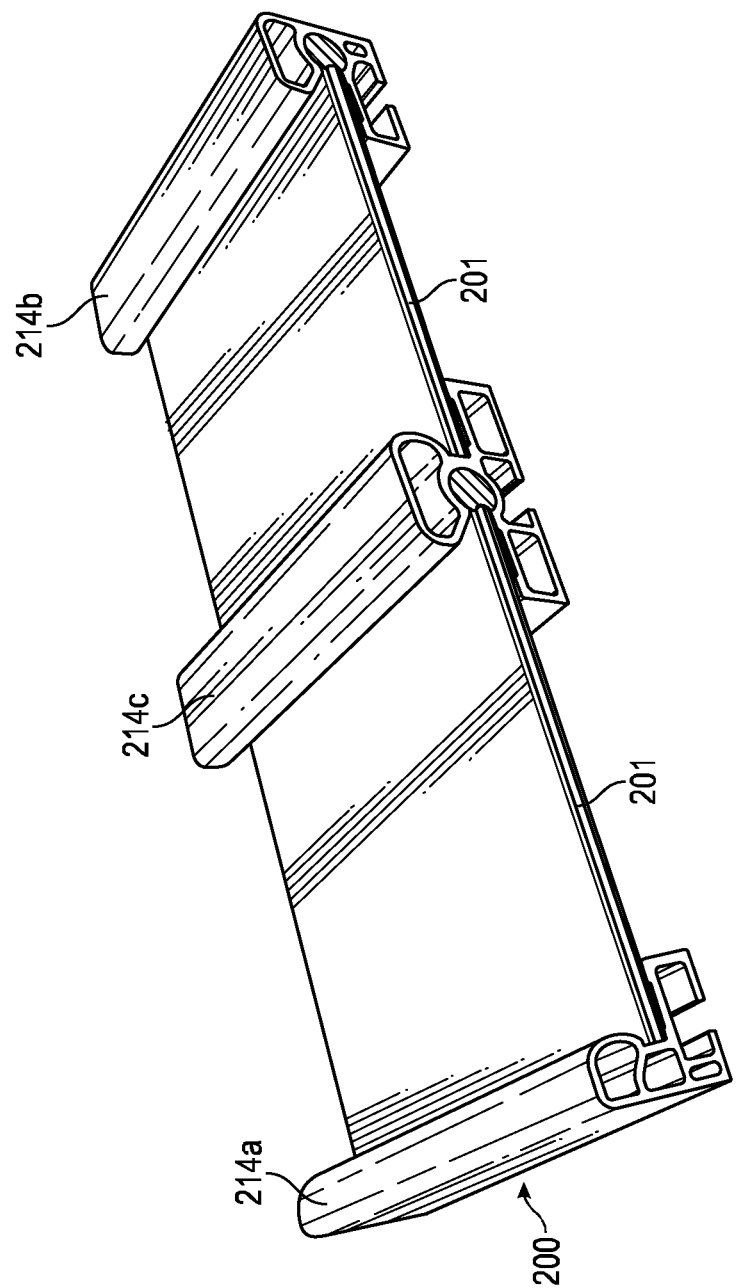
FIG. 17 is a perspective view of solar panels in an exemplary fastening or mounting apparatus.
Figure 18:
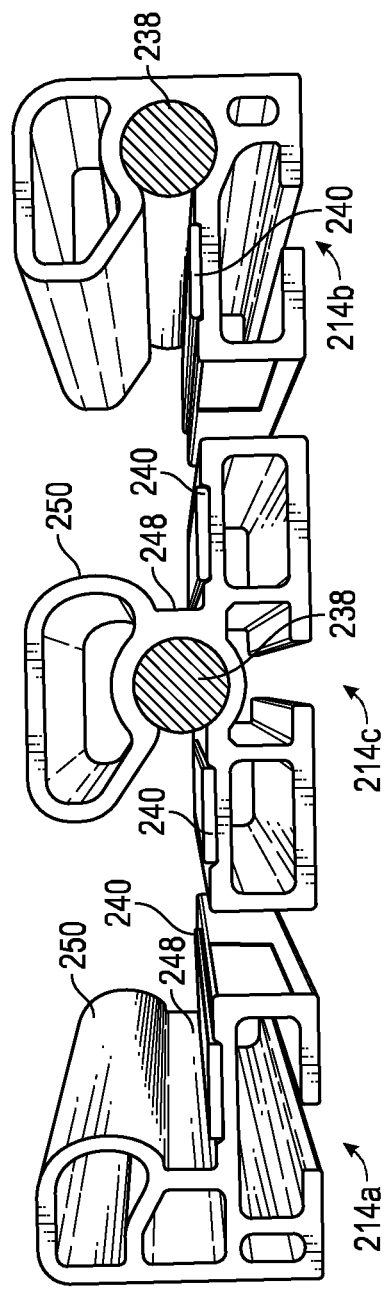
FIG. 18 is an exemplary arrangement of hook ends and cam ends for a serial fastening or mounting system.

Referring to FIGS. 17-18, an exemplary fastening or mounting apparatus 200 that can be used to serially secure structures through a snapping action is described. In the example of FIGS. 17-18, the structures being secured in place are solar photovoltaic panels 201. In the serial arrangement, one or more center connectors 214c may be used between a terminal cam portion 214a and a terminal hook portion 214b. One or more of the terminal cam portion 214a, center connector 214c and the terminal hook portion 214b may be affixed to (directly or indirectly) or formed integrally with a frame for supporting solar photovoltaic panels 201. The center connectors 214c may comprise back-to-back hook and cam portions as drawn. If center connectors 214c are arranged serially between terminal cam portions 214a and terminal hook portions 214b, each detent of each cam portion opposes and is aligned with each opening of each hook portion for insertion of an item or an object with flanges to be secured, such as solar photovoltaic panels 201. Again, the insertion step involves compressing the resilient member 238 with a portion of a solar panel or other item or object to be secured, then snapping an opposite portion of the item or object into a detent.

This solar panel exemplary application is a heavy-duty application since the solar photovoltaic panels 201 and their foundational structures and frames may be subject to harsh weather conditions, including hurricane winds, torrential rain, acid rain, and other harsh conditions. Such foundational structures are used in, for example, solar farms. In such an exemplary system, the fastening or mounting apparatus 200 makes the solar photovoltaic panels 201 easier to install relative to conventional mounting racks and a plurality of clamps (typically four clamps) requiring a series of nuts and bolts.

In the exemplary arrangement shown in FIGS. 17-18, strips 240 reside, at least partially, in a recess of a surface extending from the cam portions 214a and in a recess of a surface extending from the hook ends 214b and in recess of a surface extending from a center connector 214c. Materials used for strips 240 may vary depending upon function. Strips 240 may provide padding for the solar photovoltaic panels 201. Such strips 240 may be insulative and provide cushioning against a frame containing cam end 214a and hook end 214b. Exemplary, non-limiting materials for such strips 240 may be a natural or synthetic rubber, including a silicone rubber, polymers, or other material. Because of the secure and reliable connection provided by the disclosed fastening or mounting apparatus, strips 240 may additionally or alternatively provide an electrical connection with one or more receptors on solar photovoltaic panels 201. Such strips 240 would include conductive materials or coatings, or semiconductive materials or coatings. Such strips may be modified to increase or decrease surface area for suitable electrical traits. Additionally, strips 240 need not be "strips" in their shape, and the need not reside partially or wholly in recesses. For example, if strips 240 are intended for use as an electrical connection and greater surface area is needed, strips 240 could be shaped co-extensively with all areas of contact between the photovoltaic solar panel 201 and framework having one or more of a cam portion 214a, hook portion 214b or center connector 214c. The strip 240 can be circular, irregular, or otherwise shaped to carry out its intended purpose for a particular installation, whether that be padding, electrical connection, both, or another purpose.

While the fastening or mounting apparatuses have been described in reference to some exemplary embodiments, these embodiments are not limiting and are not necessarily exclusive of each other, and it is contemplated that particular features of various embodiments may be omitted or combined for use with features of other embodiments while remaining within the scope of the invention. The apparatuses may be scaled up or down for use in applications not expressly disclosed or referenced herein, and the materials may be selected for certain properties such as conductivity, insulative properties, rigidity and the like.

What is claimed is:

1. A fastening apparatus, comprising:
   a plate having a top side, a bottom side, and a first end opposite a second end, the first end having a first lip extending downwardly from the bottom side of the plate, the first lip at least partially defining a channel with a projection from the lip, the channel being positioned along the length of the first end, the channel having a natural or synthetic polymeric reversibly compressible strip or cord in the channel, the channel having an aperture along the length of the channel, the aperture facing a second lip on a second end, the second lip extending downwardly from the bottom side of the plate, the second lip having a detent portion and a portion that is shaped substantially semicircular and is convex relative to the first lip; wherein the fastening device is removably securable to an object via compression of the strip or cord in the channel with the object and snap action to secure the object between the first and second lip.

2. A fastening apparatus, comprising:

a hook portion comprising a lip at least partially defining a cavity together with a projection extending from the lip, with a reversibly compressible strip or cord comprising a natural or synthetic polymer, the strip or cord being within the cavity, the strip or cord being at least partially exposed through an opening in the cavity; and a cam portion opposite the hook portion, the cam portion having a detent and a convex portion;

the hook portion and the cam portion being directly or indirectly structurally connected and configured to be releasably fastenable by resiliency of strip or cord following compression.

3. The fastening apparatus of claim 2 wherein the strip or cord has a Type A scale Durometer of between 40 and 90.

4. The fastening apparatus of claim 2 wherein the strip or cord comprises at least one of a natural rubber, a synethtic rubber and a polymer.

5. The fastening apparatus of claim 2 wherein the detent is concave.

6. The fastening apparatus of claim 2 wherein the detent is flat.

7. The fastening apparatus of claim 2 the convex portion is substantially semicircular.

8. The fastening apparatus of claim 2 wherein the cam portion and the hook portion are in one of a battery housing or a battery tray.

9. The fastening apparatus of claim 8 further including an electrical connection for electrical communication with a battery.

10. The fastening apparatus of claim 2 wherein the cam portion and the hook portion are in a structure for supporting a solar panel.

11. The fastening apparatus of claim 10 further including an electrical connection for electrical communication with the solar panel.

12. The fastening apparatus of claim 2 wherein the hook portion and the cam portion are positioned opposite one another.

13. The fastening apparatus of claim 2 wherein the hook portion and the cam portion are positioned to face one another.

14. A fastening system, comprising:

a terminal hook portion comprising a lip at least partially defining a cavity with a reversibly compressible strip or cord comprising a natural or synthetic polymer therein, the reversibly compressible strip or cord being partially exposed through an opening in the cavity;

a terminal cam portion opposite the hook portion, the cam portion having a detent and a convex portion; and at least one center connector between the terminal hook portion and the terminal cam portion, the center connector having back-to-back hook and cam portions such that each hook portion in the fastening system corresponds with and faces one cam portion inclusive of the terminal hook portion and the terminal cam portion;

wherein each detent is opposite the opening of its corresponding hook portion and each pair of hook and corresponding cam portion is releasably fastenable to an object having a first end insertable into the opening by compressing the reversibly compressible strip or cord and a second end snappable into the corresponding detent.

15. The fastening system of claim 14 adapted to receive solar photovoltaic panels between each pair of hook and corresponding cam portions.

16. The fastening system of claim 15 further comprising at least one electrical connection between the fastening system and at least one of the solar photovoltaic panels.

* * * * *